United States Patent
Lemson et al.

(10) Patent No.: US 11,297,603 B2
(45) Date of Patent: *Apr. 5, 2022

(54) NEUTRAL HOST ARCHITECTURE FOR A DISTRIBUTED ANTENNA SYSTEM

(71) Applicant: DALI WIRELESS, INC., Menlo Park, CA (US)

(72) Inventors: Paul Lemson, Woodinville, WA (US); Shawn Patrick Stapleton, Vancouver (CA); Sasa Trajkovic, Burnaby (CA)

(73) Assignee: DALI WIRELESS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,252

(22) Filed: May 8, 2019

(65) Prior Publication Data

US 2020/0092848 A1 Mar. 19, 2020

Related U.S. Application Data

(63) Continuation of application No. 15/786,396, filed on Oct. 17, 2017, now Pat. No. 10,334,567, which is a
(Continued)

(51) Int. Cl.
  *H04W 72/04* (2009.01)
  *H04B 1/18* (2006.01)
  *H04B 1/40* (2015.01)

(52) U.S. Cl.
  CPC .............. *H04W 72/04* (2013.01); *H04B 1/18* (2013.01); *H04B 1/40* (2013.01)

(58) Field of Classification Search
  CPC .................................... H04B 1/18; H04B 1/40
  See application file for complete search history.

(56) References Cited

U.S. PATENT DOCUMENTS

| 4,755,795 A | 7/1988 | Page |
| 4,999,831 A | 3/1991 | Grace |

(Continued)

FOREIGN PATENT DOCUMENTS

| CN | 1484887 A | 3/2004 |
| CN | 1652520 A | 8/2005 |

(Continued)

OTHER PUBLICATIONS

US 9,136,967 B2, 09/2015, Fischer et al. (withdrawn)
(Continued)

*Primary Examiner* — Brian D Nguyen
(74) *Attorney, Agent, or Firm* — Artegis Law Group, LLP

(57) ABSTRACT

A remote radio head unit (RRU) system for achieving high data rate communications in a Distributed Antenna System is disclosed. The Distributed Antenna System is configured as a Neutral Host enabling multiple operators to exist on one DAS system. The present disclosure enables a remote radio head unit to be field reconfigurable and support multi-modulation schemes (modulation-independent), multi-carriers, multi-frequency bands and multi-channels. As a result, the remote radio head system is particularly suitable for wireless transmission systems, such as base-stations, repeaters, and indoor signal coverage systems.

19 Claims, 6 Drawing Sheets

Related U.S. Application Data continuation of application No. 14/479,875, filed on Sep. 8, 2014, now Pat. No. 9,826,508, which is a continuation of application No. 13/211,236, filed on Aug. 16, 2011, now Pat. No. 8,848,766.

(60) Provisional application No. 61/374,593, filed on Aug. 17, 2010.

(56) References Cited

U.S. PATENT DOCUMENTS

| | | |
|---|---|---|
| 5,457,557 A | 10/1995 | Zarem et al. |
| 5,579,341 A | 11/1996 | Smith et al. |
| 5,619,202 A | 4/1997 | Wilson et al. |
| 5,621,730 A | 4/1997 | Kelley |
| 5,627,879 A | 5/1997 | Russell et al. |
| 5,644,622 A | 7/1997 | Russell et al. |
| 5,748,683 A | 5/1998 | Smith et al. |
| 5,794,153 A | 8/1998 | Ariyavisitakul et al. |
| 5,810,888 A | 9/1998 | Fenn |
| 5,818,883 A | 10/1998 | Smith et al. |
| 5,852,651 A | 12/1998 | Fischer et al. |
| 5,880,863 A | 3/1999 | Rideout et al. |
| 6,005,506 A | 12/1999 | Bazarjani et al. |
| 6,005,884 A | 12/1999 | Cook et al. |
| 6,014,366 A | 1/2000 | Ichiyoshi |
| 6,072,364 A | 6/2000 | Jeckeln et al. |
| 6,112,086 A | 8/2000 | Wala |
| 6,253,094 B1 | 6/2001 | Schmutz |
| 6,266,531 B1 | 7/2001 | Zadeh et al. |
| 6,353,600 B1 | 3/2002 | Schwartz et al. |
| 6,356,369 B1 | 3/2002 | Farhan |
| 6,373,611 B1 | 4/2002 | Farhan et al. |
| 6,393,007 B1 | 5/2002 | Haartsen |
| 6,493,335 B1 | 12/2002 | Darcie et al. |
| 6,594,496 B2 | 7/2003 | Schwartz |
| 6,625,429 B1 | 9/2003 | Yamashita |
| 6,657,993 B1 | 12/2003 | Casanova et al. |
| 6,697,603 B1 | 2/2004 | Lovinggood et al. |
| 6,704,545 B1 | 3/2004 | Wala |
| 6,724,737 B1 | 4/2004 | Boyden et al. |
| 6,785,558 B1 | 8/2004 | Stratford et al. |
| 6,801,767 B1 | 10/2004 | Schwartz et al. |
| 6,804,540 B1 | 10/2004 | Shepherd et al. |
| 6,826,164 B2 | 11/2004 | Mani et al. |
| 6,831,901 B2 | 12/2004 | Millar |
| 6,836,660 B1 | 12/2004 | Wala |
| 6,963,552 B2 | 11/2005 | Sabat, Jr. et al. |
| 6,980,527 B1 | 12/2005 | Liu et al. |
| 7,102,442 B2 | 9/2006 | Anderson |
| 7,145,704 B1 | 12/2006 | Islam |
| 7,257,328 B2 | 8/2007 | Levinson et al. |
| 7,283,519 B2 | 10/2007 | Girard |
| 7,286,507 B1 | 10/2007 | Oh et al. |
| 7,339,891 B2 | 3/2008 | Binder et al. |
| 7,339,897 B2 | 3/2008 | Larsson et al. |
| 7,362,776 B2 | 4/2008 | Meier et al. |
| 7,489,632 B2 | 2/2009 | Lakkakorpi |
| 7,496,367 B1 | 2/2009 | Ozturk et al. |
| 7,610,460 B2 | 10/2009 | Watanabe et al. |
| 7,634,536 B2 | 12/2009 | Halasz |
| 7,639,982 B2 | 12/2009 | Wala |
| 7,650,112 B2 | 1/2010 | Utsumi et al. |
| 7,765,294 B2 | 7/2010 | Edwards et al. |
| 7,787,854 B2 | 8/2010 | Conyers et al. |
| 7,801,038 B2 | 9/2010 | Liao et al. |
| 7,826,369 B2 | 11/2010 | Filsfils et al. |
| 7,848,747 B2 | 12/2010 | Wala |
| 7,848,770 B2 | 12/2010 | Scheinert |
| 7,855,977 B2 | 12/2010 | Morrison et al. |
| 8,010,099 B2 | 8/2011 | Ma et al. |
| 8,010,116 B2 | 8/2011 | Scheinert |
| 8,032,148 B2 | 10/2011 | Hettstedt et al. |
| 8,036,226 B1 | 10/2011 | Ma et al. |
| 8,098,572 B2 | 1/2012 | Zhou et al. |
| 8,112,094 B1 | 2/2012 | Wellington |
| 8,139,492 B1 | 3/2012 | Peterson et al. |
| 8,213,401 B2 | 7/2012 | Fischer et al. |
| 8,274,332 B2 | 9/2012 | Cho et al. |
| 8,326,218 B2 | 12/2012 | Wala |
| 8,346,091 B2 | 1/2013 | Kummetz et al. |
| 8,346,160 B2 | 1/2013 | Kummetz |
| 8,351,877 B2 | 1/2013 | Kim et al. |
| 8,363,628 B2 | 1/2013 | Chi et al. |
| 8,369,272 B2 | 2/2013 | Barbaresi et al. |
| 8,446,530 B2 | 5/2013 | Bellers |
| 8,451,735 B2 | 5/2013 | Li |
| 8,478,331 B1 | 7/2013 | Rogers et al. |
| 8,520,603 B2 | 8/2013 | Kozisek et al. |
| 8,527,003 B2 | 9/2013 | Gupta et al. |
| 8,532,242 B2 | 9/2013 | Fischer et al. |
| 8,542,768 B2 | 9/2013 | Kim et al. |
| 8,548,526 B2 | 10/2013 | Schmidt et al. |
| 8,577,286 B2 | 11/2013 | Wala |
| 8,583,100 B2 | 11/2013 | Koziy et al. |
| 8,681,917 B2 | 3/2014 | McAllister et al. |
| 8,730,786 B2 | 5/2014 | Wang et al. |
| 8,737,300 B2 | 5/2014 | Stapleton et al. |
| 8,737,454 B2 * | 5/2014 | Wala ............. H04B 1/40 375/220 |
| 8,804,870 B2 | 8/2014 | Kim et al. |
| 8,842,649 B2 | 9/2014 | Liu et al. |
| 8,848,766 B2 | 9/2014 | Lemson et al. |
| 8,855,489 B2 | 10/2014 | Boldi et al. |
| 8,958,789 B2 | 2/2015 | Bauman et al. |
| 9,137,078 B2 | 9/2015 | Stapleton et al. |
| 9,148,324 B2 | 9/2015 | Stapleton et al. |
| 9,419,714 B2 | 8/2016 | Lemson et al. |
| 9,419,837 B2 | 8/2016 | Stapleton et al. |
| 9,531,473 B2 | 12/2016 | Lemson et al. |
| 9,820,171 B2 | 11/2017 | Lemson et al. |
| 9,826,508 B2 | 11/2017 | Lemson et al. |
| 10,045,314 B2 | 8/2018 | Stapleton et al. |
| 10,080,178 B2 | 9/2018 | Stapleton et al. |
| 10,159,074 B2 | 12/2018 | Lemson et al. |
| 10,334,499 B2 | 6/2019 | Stapleton et al. |
| 10,334,567 B2 | 6/2019 | Lemson et al. |
| 2001/0034223 A1 | 10/2001 | Rieser et al. |
| 2002/0024398 A1 | 2/2002 | Lagerblom et al. |
| 2002/0075906 A1 | 6/2002 | Cole et al. |
| 2002/0086675 A1 | 7/2002 | Mansour |
| 2002/0093926 A1 | 7/2002 | Kilfoyle |
| 2002/0186436 A1 | 12/2002 | Mani et al. |
| 2002/0187809 A1 | 12/2002 | Mani et al. |
| 2002/0191565 A1 | 12/2002 | Mani et al. |
| 2003/0021263 A1 | 1/2003 | Lee |
| 2003/0021278 A1 | 1/2003 | Domschitz et al. |
| 2003/0137932 A1 | 7/2003 | Nishioka et al. |
| 2003/0143947 A1 | 7/2003 | Lyu |
| 2003/0181221 A1 | 9/2003 | Nguyen |
| 2003/0207680 A1 | 11/2003 | Yang et al. |
| 2004/0053624 A1 | 3/2004 | Frank et al. |
| 2004/0183672 A1 | 9/2004 | Krishan et al. |
| 2005/0041968 A1 | 2/2005 | Takahashi |
| 2005/0143091 A1 | 6/2005 | Shapira et al. |
| 2005/0152695 A1 | 7/2005 | Sulzberger et al. |
| 2005/0157675 A1 | 7/2005 | Feder et al. |
| 2005/0174954 A1 | 8/2005 | Yun et al. |
| 2005/0181812 A1 | 8/2005 | Scheck |
| 2005/0206564 A1 | 9/2005 | Mao et al. |
| 2005/0220066 A1 | 10/2005 | Wal et al. |
| 2006/0094470 A1 | 5/2006 | Wake et al. |
| 2006/0121944 A1 | 6/2006 | Buscaglia et al. |
| 2006/0223468 A1 | 10/2006 | Toms et al. |
| 2006/0223572 A1 | 10/2006 | Hedin et al. |
| 2006/0223578 A1 | 10/2006 | Conyers et al. |
| 2006/0227736 A1 | 10/2006 | Conyers et al. |
| 2006/0239266 A1 | 10/2006 | Babbar et al. |
| 2006/0270366 A1 | 11/2006 | Rozenblit et al. |
| 2007/0019598 A1 | 1/2007 | Prehofer |
| 2007/0019679 A1 | 1/2007 | Scheck et al. |
| 2007/0058742 A1 | 3/2007 | Demarco et al. |
| 2007/0064506 A1 | 3/2007 | Bauman et al. |
| 2007/0065078 A1 | 3/2007 | Jiang |

(56) References Cited

U.S. PATENT DOCUMENTS

| | | |
|---|---|---|
| 2007/0066234 A1 | 3/2007 | Lastinger et al. |
| 2007/0116046 A1 | 5/2007 | Liu et al. |
| 2007/0121543 A1 | 5/2007 | Kuchibhotla et al. |
| 2007/0147488 A1 | 6/2007 | Han |
| 2007/0177552 A1 | 8/2007 | Wu et al. |
| 2007/0223614 A1 | 9/2007 | Kuchibhotla et al. |
| 2007/0241812 A1 | 10/2007 | Yang et al. |
| 2007/0243899 A1 | 10/2007 | Hermel et al. |
| 2007/0253389 A1 | 11/2007 | Lucidarme et al. |
| 2007/0274279 A1 | 11/2007 | Wood et al. |
| 2007/0281643 A1 | 12/2007 | Kawai |
| 2008/0045254 A1 | 2/2008 | Gupta et al. |
| 2008/0051129 A1 | 2/2008 | Abe et al. |
| 2008/0058018 A1 | 3/2008 | Scheinert |
| 2008/0069032 A1 | 3/2008 | Liu |
| 2008/0070632 A1 | 3/2008 | Obuchi et al. |
| 2008/0089689 A1 | 4/2008 | Sakama |
| 2008/0107014 A1 | 5/2008 | Huang et al. |
| 2008/0119198 A1* | 5/2008 | Hettstedt ............ H04W 16/06 455/453 |
| 2008/0146146 A1 | 6/2008 | Binder et al. |
| 2008/0152037 A1 | 6/2008 | Kim et al. |
| 2008/0165882 A1 | 7/2008 | Hedayat et al. |
| 2008/0181182 A1 | 7/2008 | Carichner et al. |
| 2008/0181282 A1* | 7/2008 | Wala ..................... H04B 1/18 375/130 |
| 2008/0225816 A1 | 9/2008 | Osterling et al. |
| 2008/0240036 A1 | 10/2008 | Liu et al. |
| 2008/0265996 A1 | 10/2008 | Kim et al. |
| 2009/0003196 A1 | 1/2009 | Capece et al. |
| 2009/0019664 A1 | 1/2009 | Abram |
| 2009/0029664 A1 | 1/2009 | Batruni |
| 2009/0046586 A1 | 2/2009 | Stuart et al. |
| 2009/0060088 A1 | 3/2009 | Callard et al. |
| 2009/0060496 A1 | 3/2009 | Liu et al. |
| 2009/0061771 A1* | 3/2009 | Ma ..................... H04B 7/2606 455/41.2 |
| 2009/0082010 A1 | 3/2009 | Lee et al. |
| 2009/0146870 A1 | 6/2009 | Thome et al. |
| 2009/0153898 A1 | 6/2009 | Sato |
| 2009/0154621 A1 | 6/2009 | Shapira et al. |
| 2009/0170543 A1 | 7/2009 | Mostafa et al. |
| 2009/0180407 A1 | 7/2009 | Sabt et al. |
| 2009/0180426 A1 | 7/2009 | Sabat et al. |
| 2009/0180462 A1 | 7/2009 | Duerdodt et al. |
| 2009/0191891 A1 | 7/2009 | Ma et al. |
| 2009/0238566 A1 | 9/2009 | Boldi et al. |
| 2009/0247092 A1 | 10/2009 | Beaudin et al. |
| 2009/0252094 A1 | 10/2009 | Chang et al. |
| 2009/0252136 A1 | 10/2009 | Mahany et al. |
| 2009/0252139 A1 | 10/2009 | Ludovico et al. |
| 2009/0274048 A1 | 11/2009 | Sambhwani et al. |
| 2009/0274085 A1 | 11/2009 | Wang et al. |
| 2009/0286484 A1 | 11/2009 | Phung et al. |
| 2010/0002661 A1 | 1/2010 | Schmidt et al. |
| 2010/0008669 A1 | 1/2010 | Rhy et al. |
| 2010/0075678 A1 | 3/2010 | Akman et al. |
| 2010/0087227 A1 | 4/2010 | Francos et al. |
| 2010/0112981 A1 | 5/2010 | Suh et al. |
| 2010/0118921 A1 | 5/2010 | Abdelmonem et al. |
| 2010/0128676 A1 | 5/2010 | Wu et al. |
| 2010/0130130 A1 | 5/2010 | Liu |
| 2010/0136932 A1 | 6/2010 | Osterling et al. |
| 2010/0136998 A1 | 6/2010 | Lott et al. |
| 2010/0157901 A1 | 6/2010 | Sanderovitz et al. |
| 2010/0176885 A1 | 7/2010 | Kim et al. |
| 2010/0177759 A1 | 7/2010 | Fischer et al. |
| 2010/0177760 A1 | 7/2010 | Cannon et al. |
| 2010/0178936 A1 | 7/2010 | Wala et al. |
| 2010/0182984 A1 | 7/2010 | Herscovici et al. |
| 2010/0202565 A1 | 8/2010 | Abbasfar |
| 2010/0238904 A1 | 9/2010 | Zhang et al. |
| 2010/0247105 A1 | 9/2010 | Yu |
| 2010/0261504 A1* | 10/2010 | Lukkarila ................ H04B 1/10 455/561 |
| 2010/0271957 A1 | 10/2010 | Stapleton et al. |
| 2010/0271985 A1* | 10/2010 | Gabriel .................. H01Q 1/246 370/278 |
| 2010/0278530 A1 | 11/2010 | Kummetz et al. |
| 2010/0279704 A1 | 11/2010 | Vachhani |
| 2010/0291949 A1 | 11/2010 | Shapira et al. |
| 2010/0296816 A1* | 11/2010 | Larsen ............ H04B 10/25754 398/116 |
| 2010/0299173 A1 | 11/2010 | Zampiello et al. |
| 2010/0304773 A1 | 12/2010 | Ramprashad |
| 2010/0311372 A1 | 12/2010 | Bouyaaud et al. |
| 2010/0315978 A1* | 12/2010 | Satapathy .............. H01Q 21/08 370/294 |
| 2010/0324814 A1 | 12/2010 | Wu et al. |
| 2011/0009056 A1 | 1/2011 | Hanson et al. |
| 2011/0069657 A1 | 3/2011 | Gholmieh et al. |
| 2011/0103309 A1 | 5/2011 | Wang et al. |
| 2011/0135013 A1 | 6/2011 | Wegener |
| 2011/0135308 A1 | 6/2011 | Tarlazzi et al. |
| 2011/0156815 A1 | 6/2011 | Kim et al. |
| 2011/0158081 A1 | 6/2011 | Wang et al. |
| 2011/0158116 A1 | 6/2011 | Tenny et al. |
| 2011/0195673 A1 | 8/2011 | Pratt et al. |
| 2011/0223958 A1 | 9/2011 | Chen et al. |
| 2011/0237178 A1* | 9/2011 | Seki ..................... H04W 36/18 455/3.01 |
| 2011/0241425 A1 | 10/2011 | Hunter, Jr. et al. |
| 2011/0249708 A1 | 10/2011 | Maca |
| 2011/0255434 A1* | 10/2011 | Ylitalo .................. H01Q 1/246 370/252 |
| 2011/0281579 A1 | 11/2011 | Kummetz |
| 2011/0287791 A1 | 11/2011 | Fujishima et al. |
| 2011/0302390 A1 | 12/2011 | Copeland et al. |
| 2011/0310810 A1 | 12/2011 | Kenington et al. |
| 2011/0310881 A1 | 12/2011 | Kenington |
| 2012/0002586 A1 | 1/2012 | Gainey et al. |
| 2012/0039254 A1 | 2/2012 | Stapleton et al. |
| 2012/0057572 A1 | 3/2012 | Evans et al. |
| 2012/0127938 A1 | 5/2012 | Lv et al. |
| 2012/0150521 A1 | 6/2012 | Balkwill |
| 2012/0154038 A1 | 6/2012 | Kim et al. |
| 2012/0155572 A1 | 6/2012 | Kim et al. |
| 2012/0206885 A1 | 8/2012 | Pan et al. |
| 2012/0281565 A1 | 11/2012 | Sauer |
| 2013/0272202 A1 | 10/2013 | Stapleton et al. |
| 2014/0126914 A1 | 5/2014 | Berlin et al. |
| 2014/0286247 A1 | 9/2014 | Lemson et al. |
| 2014/0313884 A1 | 10/2014 | Stapleton et al. |
| 2016/0014782 A1 | 1/2016 | Stapleton et al. |
| 2016/0080082 A1 | 3/2016 | Lemson et al. |
| 2017/0055198 A1 | 2/2017 | Stapleton et al. |
| 2017/0070897 A1 | 3/2017 | Lemson et al. |
| 2017/0181008 A1 | 6/2017 | Fischer |
| 2017/0214420 A1 | 7/2017 | Phillips et al. |
| 2017/0238318 A1 | 8/2017 | Lemson et al. |
| 2019/0208523 A1 | 7/2019 | Lemson et al. |
| 2020/0092787 A1 | 3/2020 | Stapleton et al. |
| 2020/0146015 A1 | 5/2020 | Lemson et al. |
| 2020/0267732 A1 | 8/2020 | Lemson et al. |

FOREIGN PATENT DOCUMENTS

| | | |
|---|---|---|
| CN | 1774094 A | 5/2006 |
| CN | 1860811 A | 11/2006 |
| CN | 100341292 C | 10/2007 |
| CN | 201127027 Y | 10/2008 |
| CN | 101394647 A | 3/2009 |
| CN | 101453699 A | 6/2009 |
| CN | 101453799 A | 6/2009 |
| CN | 101521893 A | 9/2009 |
| CN | 101523969 A | 9/2009 |
| CN | 201307942 Y | 9/2009 |
| CN | 100574122 C | 12/2009 |
| CN | 101621806 A | 1/2010 |
| CN | 101754229 A | 6/2010 |
| CN | 101754431 A | 6/2010 |
| CN | 102460385 A | 5/2012 |
| CN | 103201958 A | 7/2013 |

(56) References Cited

FOREIGN PATENT DOCUMENTS

| | | |
|---|---|---|
| EP | 0368673 A1 | 5/1990 |
| EP | 0642243 A1 | 3/1995 |
| EP | 1118234 A1 | 7/2001 |
| EP | 1566979 A1 | 8/2005 |
| EP | 1750376 A1 | 2/2007 |
| EP | 2430531 A1 | 3/2012 |
| IN | 8527/CHENP/2011 A | 3/2013 |
| JP | 1992-207532 A | 7/1992 |
| JP | 1993-136724 A | 1/1993 |
| JP | 2002-158615 A | 5/2002 |
| JP | 2002-516511 A | 6/2002 |
| JP | 2004-147009 A | 5/2004 |
| JP | 2004-153800 A | 5/2004 |
| JP | 2005-072769 A | 3/2005 |
| JP | 2007-006163 A | 1/2007 |
| JP | 2007-507957 A | 3/2007 |
| JP | 2007-523577 A | 8/2007 |
| JP | 2007-235738 A | 9/2007 |
| JP | 2008-135955 A | 6/2008 |
| JP | 2009-147656 A | 7/2009 |
| JP | 2009-147956 A | 7/2009 |
| JP | 2009-296335 A | 12/2009 |
| JP | 2010-166531 A | 7/2010 |
| JP | 2012-525093 A | 10/2012 |
| JP | 2018-064298 A | 4/2018 |
| KR | 10-1996-0702978 A | 5/1996 |
| KR | 10-2003-0061845 A | 7/2003 |
| KR | 10-2006-0097712 A | 9/2006 |
| KR | 2009-0088083 A | 8/2009 |
| KR | 10-2010-017270 A | 2/2010 |
| KR | 10-2014-0026321 A | 3/2014 |
| KR | 101874655 B1 | 7/2018 |
| WO | 98/24256 A2 | 6/1998 |
| WO | WO 99/60715 | 11/1999 |
| WO | 0019750 A1 | 4/2000 |
| WO | 01/56197 A2 | 8/2001 |
| WO | 02/23956 A2 | 3/2002 |
| WO | WO 02/48862 | 6/2002 |
| WO | WO 02/056481 | 7/2002 |
| WO | 02/102102 A1 | 12/2002 |
| WO | WO 2005/034544 | 4/2005 |
| WO | 2006/040653 A1 | 4/2006 |
| WO | 2007/127543 A2 | 11/2007 |
| WO | 2008/036976 A2 | 3/2008 |
| WO | 2008/146394 A1 | 12/2008 |
| WO | WO 2008/154077 | 12/2008 |
| WO | 2010/008794 A2 | 1/2010 |
| WO | WO 2010/043752 | 4/2010 |
| WO | 2010/124297 A1 | 10/2010 |
| WO | 2010/133942 A1 | 11/2010 |
| WO | 2012/024345 A2 | 2/2012 |
| WO | WO 2012/024343 | 2/2012 |
| WO | WO 2012/024349 | 2/2012 |

OTHER PUBLICATIONS

U.S. Appl. No. 60/877,035, filed Dec. 26, 2006, Kim et al.
U.S. Appl. No. 60/925,603, filed Apr. 23, 2007, Cho et al.
U.S. Appl. No. 61/012,416, filed Dec. 7, 2007, Kim et al.
U.S. Appl. No. 61/041,164, filed Mar. 31, 2008, Kim et al.
U.S. Appl. No. 61/172,642, filed Apr. 24, 2009, Stapleton et al.
U.S. Appl. No. 61/288,838, filed Dec. 21, 2009, Kim et al.
U.S. Appl. No. 61/288,840, filed Dec. 21, 2009, Wang et al.
U.S. Appl. No. 61/288,844, filed Dec. 21, 2009, Kim et al.
U.S. Appl. No. 61/288,847, filed Dec. 21, 2009, Kim et al.
U.S. Appl. No. 61/374,593, filed Aug. 17, 2010, Lemson et al.
U.S. Appl. No. 61/382,836, filed Sep. 14, 2010, Lemson et al.
U.S. Appl. No. 61/439,940, filed Feb. 7, 2011, Stapleton et al.
International Search Report far International Application No. PCT/US2011/047995, dated Dec. 22, 2011.
Written Opinion for International Application No. PCT/US2011/047995, dated Dec. 22, 2011.
International Preliminary Report on Patentability for International Application No. PCT/US2011/047995, dated Aug. 30, 2012.
International Search Report for International Application No. PCT/US2011/048004, dated Jan. 5, 2012.
Written Opinion for International Application No. PCT/US2011/048004, dated Jan. 5, 2012.
Office Action (Including Translation) for Chinese Patent Application No. 201180050053.9, dated Feb. 25, 2015.
Office Action (Including Translation) for Chinese Patent Application No. 201180050053.9, dated Nov. 9, 2015.
Office Action (Including Translation) for Chinese Patent Application No. 201180050053.9, dated Apr. 20, 2016.
Office Action (Including Translation) for Chinese Patent Application No. 201180050053.9, dated Dec. 6, 2016.
Notification of Grant Patent Right for Invention (Including Translation) for Chinese Patent Application No. 201180050053.9, dated Jun. 29, 2017.
Office Action for Chinese Patent Application No. 201710791641.7, dated Apr. 28, 2019.
Notification of Grant of Patent for Invention (Including Translation) for Chinese Patent Application No. 201710791641.7, dated Dec. 4, 2019.
European Search Report for European Application No. 11818694.9, dated Apr. 11, 2017.
Office Action for European Application No. 11818694.9, dated Feb. 13, 2018.
Office Action for European Application No. 11818694.9, dated Nov. 12, 2018.
Summons to Attend Oral Proceedings Pursuant to Rule 115(1) EPC for European Application No. 11818694.9, dated Sep. 30, 2019.
European Search Report for European Application No. 20160422.0, dated Mar. 25, 2020.
Notice of Decision to Grant for Indonesian Patent Application No. W00201300982, dated Nov. 9, 2017.
Examination Report for Indian Patent Application No. 1764/CHENP/2013, dated Jun. 14, 2019.
Office Action (Including Translation) for Japanese Patent Application No. 2013-524941, dated Jun. 23, 2015.
Decision to Grant (Including Translation) for Japanese Patent Application No. 2013-524941, dated Mar. 1, 2016.
Office Action (Including Translation) for Korean Application No. 10-2013-7006774, dated Oct. 11, 2015.
Notice of Allowance (Including Translation) for Korean Application No. 10-2013-7006774, dated Jun. 29, 2016.
Office Action (Including Translation) for Korean Application No. 10-2016-7026899, dated Jan. 19, 2017.
Notice of Grant (Including Translation) for Korean Application No. 10-2016-7026899, dated Nov. 28, 2017.
Office Action (Including Translation) for Korean Application No. 10-2018-7005866, dated May 30, 2018.
Office Action for U.S. Appl. No. 13/211,236, dated Oct. 23, 2012.
Office Action for U.S. Appl. No. 13/211,236, dated Mar. 29, 2013.
Notice of Allowance for U.S. Appl. No. 13/211,236, dated May 29, 2014.
Office Action for U.S. Appl. No. 14/479,875, dated May 6, 2016.
Office Action for U.S. Appl. No. 14/4/9,875, dated Jan. 20, 2017.
Notice of Allowance for U.S. Appl. No. 14/479,875, dated Jul. 19, 2017.
Office Action for U.S. Appl. No. 15/786,396 dated Jul. 12, 2018.
Notice of Allowance for U.S. Appl. No. 15/786,396 dated Feb. 8, 2019.
Notice of Allowance received for U.S. Appl. No. 16/901,116, dated Apr. 21, 2021, 50 pages.
Notice of Allowance received for U.S. Appl. No. 16/410,860, dated Jan. 7, 2021, 54 pages.
BICSI, "Network Design Basics for Cabling Professionals", McGraw-Hill, New York, NY, USA, 2002, 393 pages.
Common Public Radio Interface {CPRI) Specification V1 .4, dated Mar. 31, 2006, downloaded from http://www.cpri.info/spec.html on Mar. 28, 2017, 64 pages.
Common Public Radio Interface {CPRI) Specification V2.1 , dated Mar. 31, 2006, downloaded from http://www.cpri.info/spec.html on Mar. 28, 2017, 76 pages.

(56) References Cited

OTHER PUBLICATIONS

Common Public Radio Interface {CPRI} Specification V3.0, dated Oct. 20, 2006, downloaded from http://www.cpri.info/spec.html on Mar. 28, 2017, 89 pages.
Common Public Radio Interface {CPRI} Specification V4.0, dated Jun. 30, 2008, downloaded from http://www.cpri.info/spec.html on Mar. 28, 2017, 96 pages.
Common Public Radio Interface {CPRI} Specification V4.1 , dated Feb. 18, 2009, downloaded from http://www.cpri.info/spec.html on Mar. 28, 2017, 109 pages.
Grundmann et al., "An empirical comparison of a distributed antenna microcell system versus a single antenna microcell system for indooor spread spectrum communications at 1.8 GHz", ICUPC Conference, 1993, 5 pages.
Zhaohui et al., "A rake type receiver structure for CDMA mobile communication systems using antenna arrays", IEEE, 1996, pp. 528-530.
Kester, Walt, Mastering The Mix In Signal Processing, Mixed-Signal Design Seminar, Analog Devices, Inc., 1991, 3 pages.
Grace, Martin K., "Synchronous quantized subcarrier multiplexing for transport of video, voice, and data", IEEE Journal on Selected Areas in Communications, vol. 8, No. 7, Sep. 1990, pp. 1351-1358.
Wala, Philip M., "A new microcell architecture using digital optical transport", IEEE, 1993, pp. 585-588.
Crofut, Walter, "Remote monitoring of wirelss base stations", Jun. 1, 1998, http://urgentcomm.com/prinUmag/remote-monitoring-wireless-base-stations, downloaded on Mar. 13, 2017, 4 pages.
Cyr et al., "The digital age is here, Digital radio frequency transport enhances cellular network performance", Jul. 4, 1993, Telephony, pp. 20-24.
CityCell 824, "Remote Site Manual, How to use it, Preliminary Version"; Feb. 1, 1993, 237 pages.
Cheun, Kyungwhoon, "Performance of direct-sequence spread-spectrum rake receives with random spreading sequences", IEEE Transactions On Communication, vol. 45, No. 9, Sep. 9, 1997, pp. 1130-1143.
Brunner et al., "On space-time rake receiver structure for WCDMA", 1999, IEEE, pp. 1546-1551.
Graf, Rudolf F., "Modern Dictionary of Electronics, 7th Ed.", Newnes publishing, 1999, 9 pages.
Introduction to Receivers" Available at http://weww.ece.ucsb.eduHong/ece145a/lntroduction_to_Receivers.pdf" downloaded Jun. 15, 2017, 28 pages.
Pereira, Stephen M., "Standardizing Digital IF Data Transfer with VITA 49", RTC Magazine, downloaded Jun. 15, 2017 from http://rtcmagazine.com/articles/view/100460, 5 pages.
Lan et al., "GSM Co-Channel and Adjacent Channel Interference Analysis and Optimization", Tsinghua Science And Technology, ISSN 1007-0214 04/12, Dec. 2011, vol. 16, No. 5, pp. 583-588.
Laplante, Phillip A. "Comprehensive Dictionary of Electrical Engineering" IEEE Press; CRC Press LLC, 1999; 4 pages.
Microsoft Press "Computer Dictionary: The Comprehensive Standard for Business, School, Library, and Home", 1991, Microsoft Press, ISBN 1-55615-231-0, 6 pages.
Wiley Electrical and Electronics Engineering Dictionary, 2004, Wiley & Sons, Inc., 7 pages.
Parker, Sybil P. "McGraw-Hill Dictionary of Science and Technical Terms: 5th Edition" McGraw-Hill, Inc. 1994; 6 pages.
Horak, Ray, "Telecommunications and Data Communications Handbook", 2007, Wiley & Sons, Inc., 55 pages.
Spurgeon, Charles E., "Ethernet, The Definitive Guide", 2000, O'reilly & Assoc., Inc., 112 pages.
ADC Digivance "Street-Level Coverage Solution (SCS)", Aug. 2005, 8 pages.
ADC Digivance "Street-Level Coverage Solution System with Version 3.01 EMS Software Operation and Maintenance Manual", ADCP-75-187, Issue 1, Sep. 2005, 78 pages.
ADC Digivance "CXD Multi-Band Distributed Antenna System Installation and Operation Manual", ADCP-75-192 Preliminary Issue D; Oct. 2005, 122 pages.
ADC Digivance "Street-Level Coverage Solution 800 MHz, 1900 MHz, and 800/900 MHz SMR System Operation and Maintenance Manual" ADCP-75-187, Preliminary Issue 1B, Nov. 2005, 88 pages.
ADC Digivance "CXD Multi-Band Distributed Antenna System Operation Manual", ADCP-75-192, Issue 1, Dec. 2005, 130 pages.
ADC Digivance "Indoor Coverage Solution 800 MHz Single- or Multi-Mode Fiber System Installation and Operation Manual", ADC-75-130, Preliminary Issue 3C, Aug. 2006, 78 pages.
ADC Digivance "NXD Radio Access Node (RAN) Installation and Maintenance Manual", ADCP-75-210, Issue 1, Nov. 2006, 84 pages.
ADC "ADC FlexWave Prism Element Management System 6.0", User Manual, ADCP-77-152, Issue 1, Mar. 2010, 308 pages.
ADC "ADC FlexWave Prism Element Management System 7.1", User Manual, ADCP-77-177, Issue 1, Jul. 2011, 350 pages.
ADC "ADC FlexWave Prism 6.0", Troubleshooting Guide, ADCP-77-074, Issue 1, Oct. 2010, 62 pages.
ADC "ADC FlexWave Prism Remote RF Module", Installation Instructions, ADCP-77-079, Issue 2, Mar. 2010, 30 pages.
ADC "ADC FlexWave Prism Remote RF Module", Installation Instructions, ADCP-77-079, Issue 3, Jul. 2011, 32 pages.
ADC "ADC FlexWave Prism Remote 40W Rf Module", Installation Instructions, ADCP-77-162, Issue 1, Mar. 2010, 26 pages.
ADC "ADC FlexWave Prism Remote Unit", Installation Guide, ADCP-77-072, Issue 4, Jul. 2011, 44 pages.
ADC "ADC FlexWave Prism Remote Unit", Installation Guide, ADCP-77-072, Issue 5, Nov. 2011, 44 pages.
ADC "FlexWave Prism Flexible Outdoor Wireless Coverage and Capacity", 106969AE, Oct. 2008, 8 pages.
ADC "ADC FlexWave Prism Host, Remote and EMS 5.1", System Reference, ADCP-77-073, Issue 2, Nov. 2009, 364 pages.
ADC "FlexWave URH Operation and Maintenance Manual—Preliminary", 2007, 7 pages.
ADC "ADC FlexWave Universal Radio Head (URH) Remote Unit Installation Instructions", ADCP-75-34 7, Issue 1, Apr. 2008, 32 pages.
ADC "ADC FlexWave Universal Radio Head (URH) Host Unit Installation Instructions", ADCP-75-348, Issue 1, Apr. 2008, 44 pages.
ADC FlexWave User Manual, "FlexWave Web-Based Element Management System for Universal Radio Head System", Version 2/Version 3, ADCP-75-352, Issue 1, Aug. 2008, 160 pages.
Das et al., "A Dynamic Load balancing Strategy for Channel Assignment Using Selective Borrowing in Cellular Mobile Environment", Wireless Networks, vol. 3,1997, pp. 333-347.
ETSI TS 125 101 V.3.11.0 "Universal Mobile Telecommunications System (UMTS); UE Radio Transmission and Reception (FDD) (3GPP TS 25.101 Version 3.11.0 Release 1999", Jun. 2002, 69 pages.
ETSI TS 125 423 V5.6.0 "Universal Mobile Telecommunications System (UMTS); UTRAN lur Interface Radio Network Subsystem Application Part (RNSAP) Signaling (3GPP TS 25.423 version 5.6.0 Release 5)", Jun. 2003, 559 pages.
Hollis et al., "The Theory of Digital Down Conversion", Hunt Engineering, Jun. 26, 2003, 6 pages.
Information Sciences Institute, University of Southern California, "DOD Standard Internet Protocol", RFC 760, Jan. 1980, 46 pages.
Information Sciences Institute, University of Southern California, "Internet Protocol; DARPA Internet Program; Protocol Specification", RFC 791, Sep. 1981, 49 pages.
OBSAI "Open Base Station Architecture Initiative: BTS System Reference Document", Version 2.0; Apr. 27, 2006, 151 pages.
OBSAI "Open Base Station Architecture Initiative: Reference Point 3 Specification" Version 3.1, Nov. 13, 2006, 116 pages.
OBSAI "Open Base Station Architecture Initiative: Reference Point 3 Specification", Version 4.1, Jul. 14, 2008, pp. 1-144.
Notice of Allowance received for U.S. Appl. No. 17/000,188, dated Jan. 19, 2021, 103 pages.
Non-Final Office Action received for U.S. Appl. No. 16/592,615, dated Feb. 3, 2021, 59 pages.
Final Office Action received for U.S. Appl. No. 16/737,419, dated Mar. 11, 2021, 41 pages.

(56) References Cited

OTHER PUBLICATIONS

Notice of Allowance received for U.S. Appl. No. 16/777,306, dated Jan. 25, 2021, 49 pages.
Extended European Search Report for application No. 20196761.9 dated Dec. 23, 2020.
Notice of Allowance received for U.S. Appl. No. 16/777,306, dated May 17, 2021, 24 pages.
Notice of Allowance received for U.S. Appl. No. 17/000,188 dated Nov. 25, 2020, 42 pages.
Notice of Allowance received for U.S. Appl. No. 16/944,028, dated Apr. 7, 2021, 31 pages.
Notice of Allowance received for U.S. Appl. No. 16/901,116, dated Jun. 23, 2021, 56 pages.
Notice of Allowance received for U.S. Appl. No. 16/592,615, dated Sep. 23, 2021, 20 pages.
Non Final Office Action received for U.S. Appl. No. 17/234,482, dated Sep. 15, 2021, 55 pages.
Common Public Radio Interface {CPRI) Specification V4.1, dated Feb. 19, 2009, downloaded from http://www.cpri.info/spec.html on Mar. 28, 2017, 109 pages.
Graf, Rudolf F., "Modem Dictionary of Electronics, 7th Ed.", Newnes publishing, 1999, 9 pages.
Introduction to Receivers" Available at http://weww.ece.ucsb.eduHong/ece145a/lntroduction_to_Receivers.pdr" downloaded Jun. 15, 2017, 28 pages.
Niley Electrical and Electronics Engineering Dictionary, 2004, Wiley & Sons, Inc., 7 pages.

\* cited by examiner

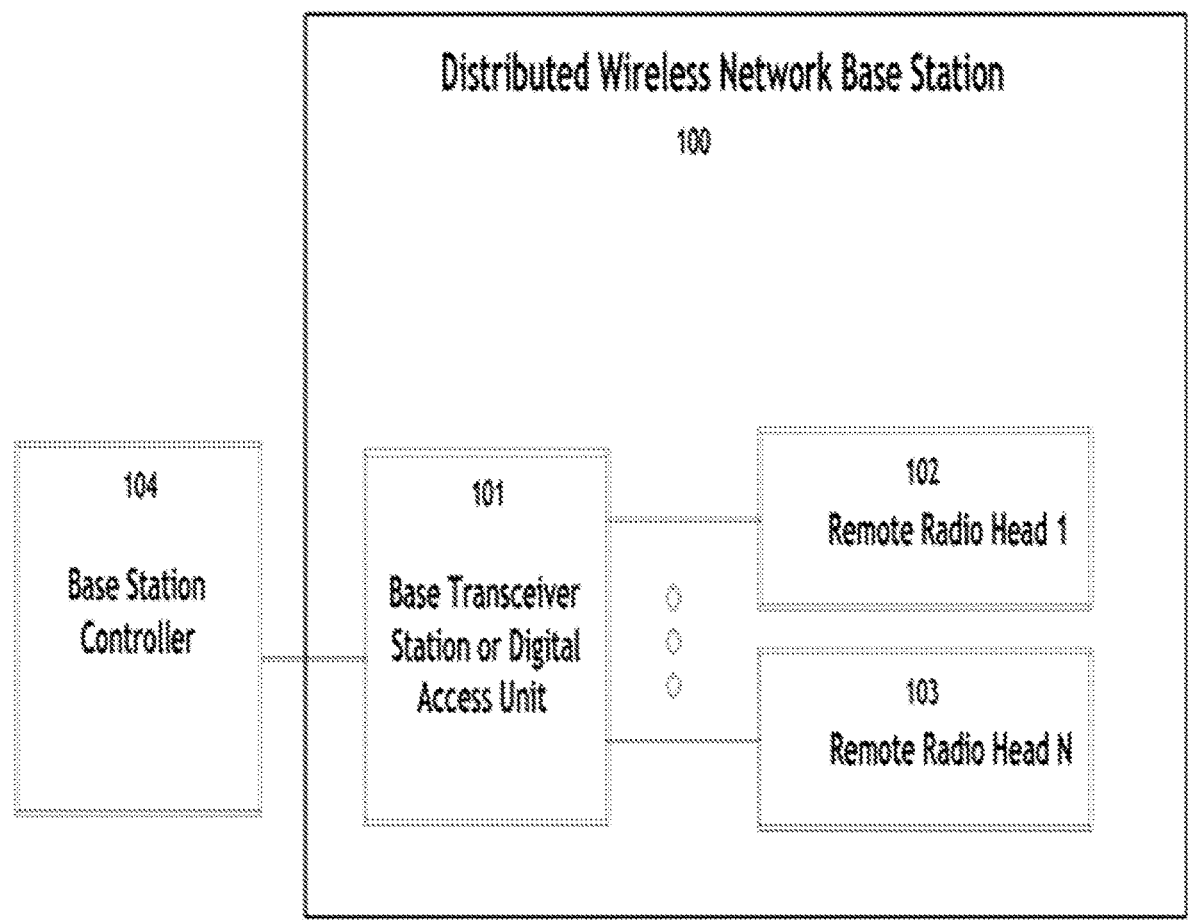
FIG. 1: PRIOR ART

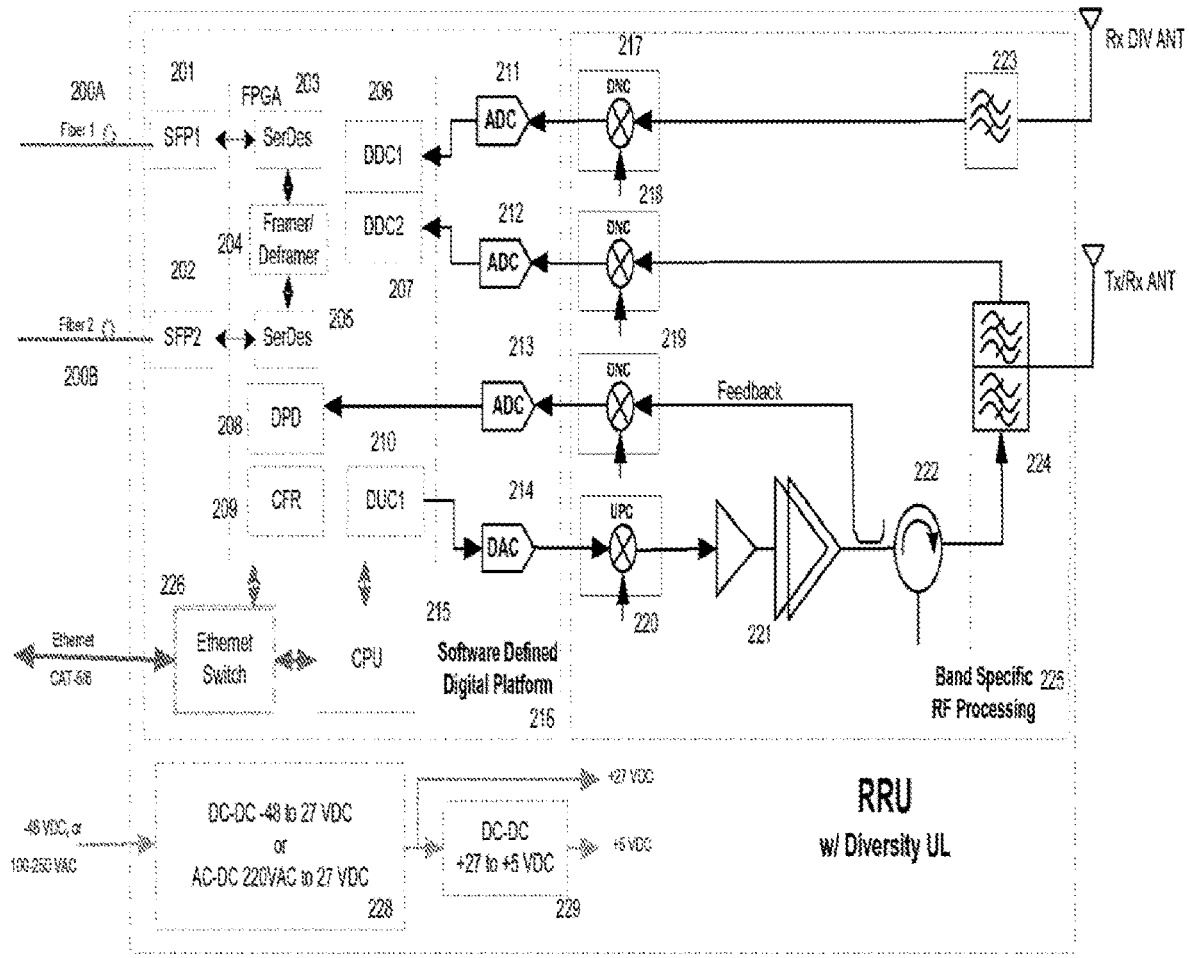
FIG. 2: Remote Radio Head Unit

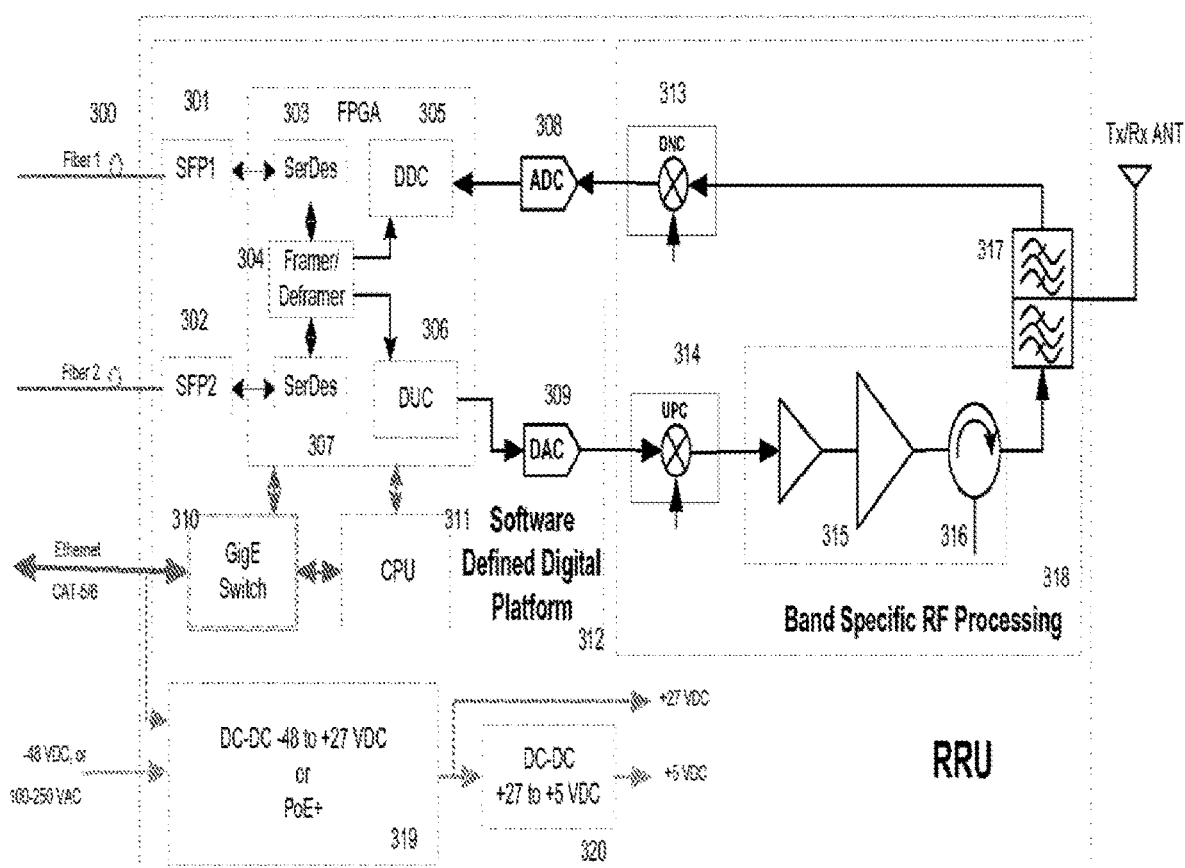
FIG. 3: Remote Radio Head Unit

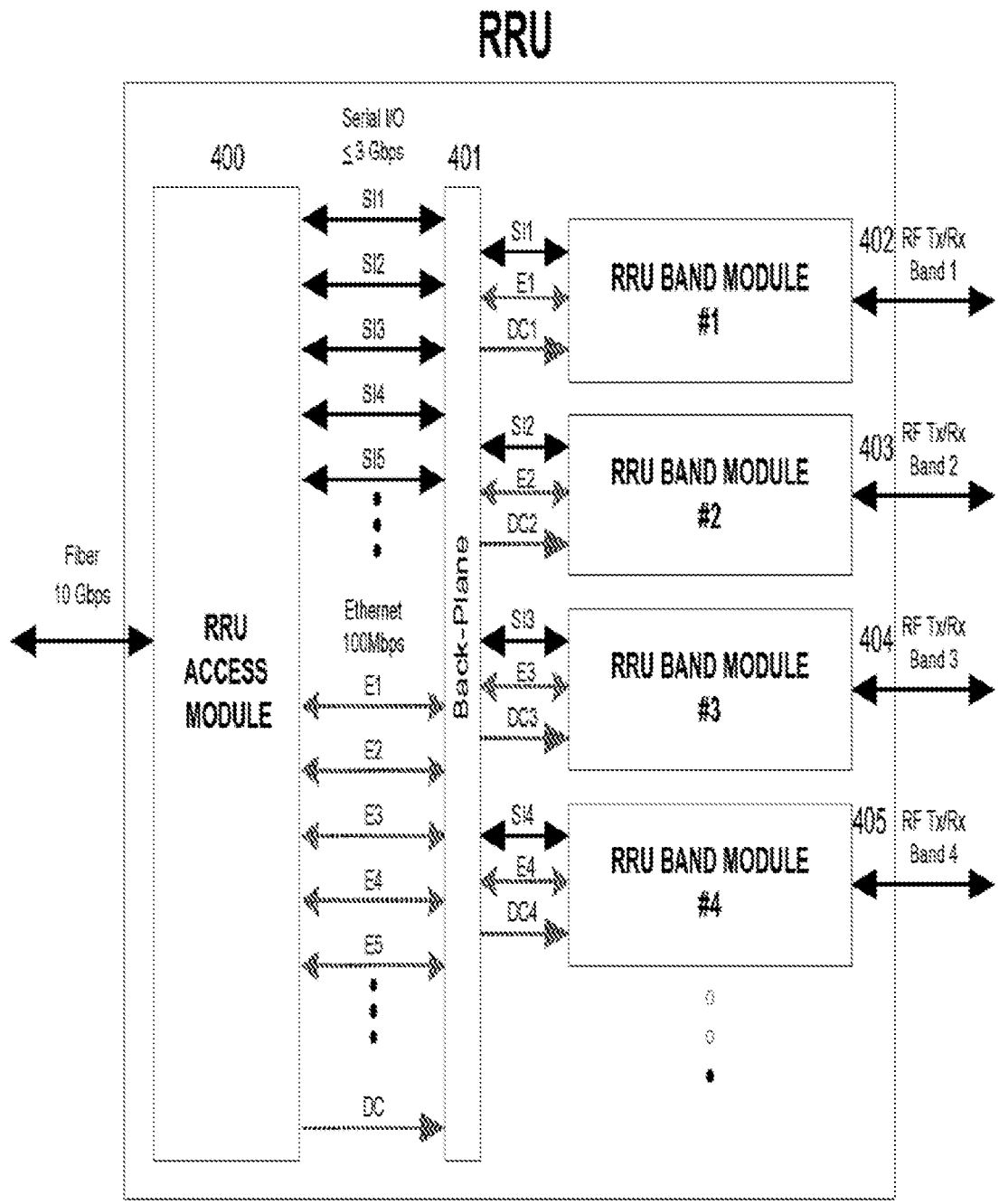
FIG. 4: Remote Radio Head Unit High Level System

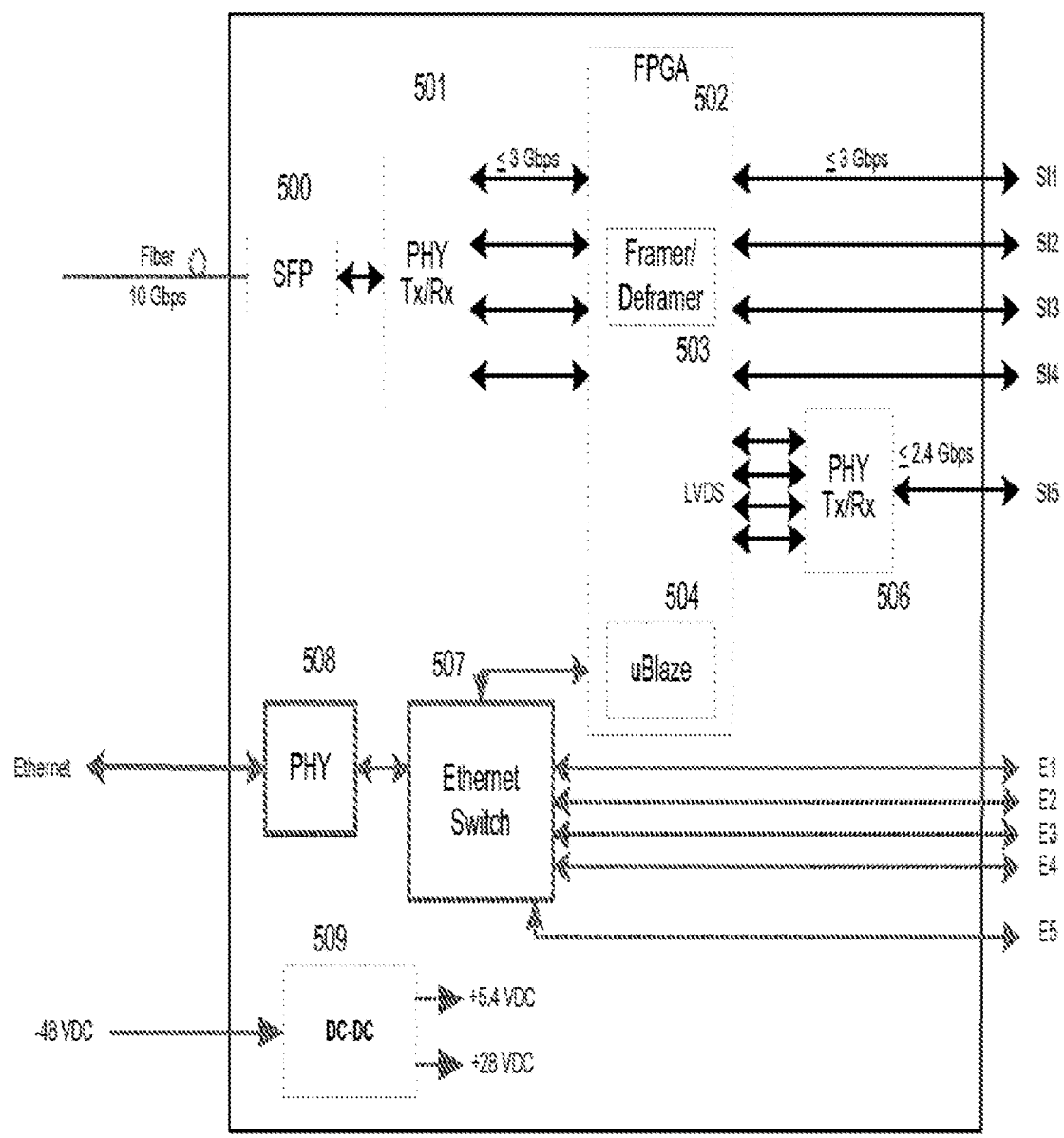
*FIG. 5: Remote Radio Head Unit Access Module*

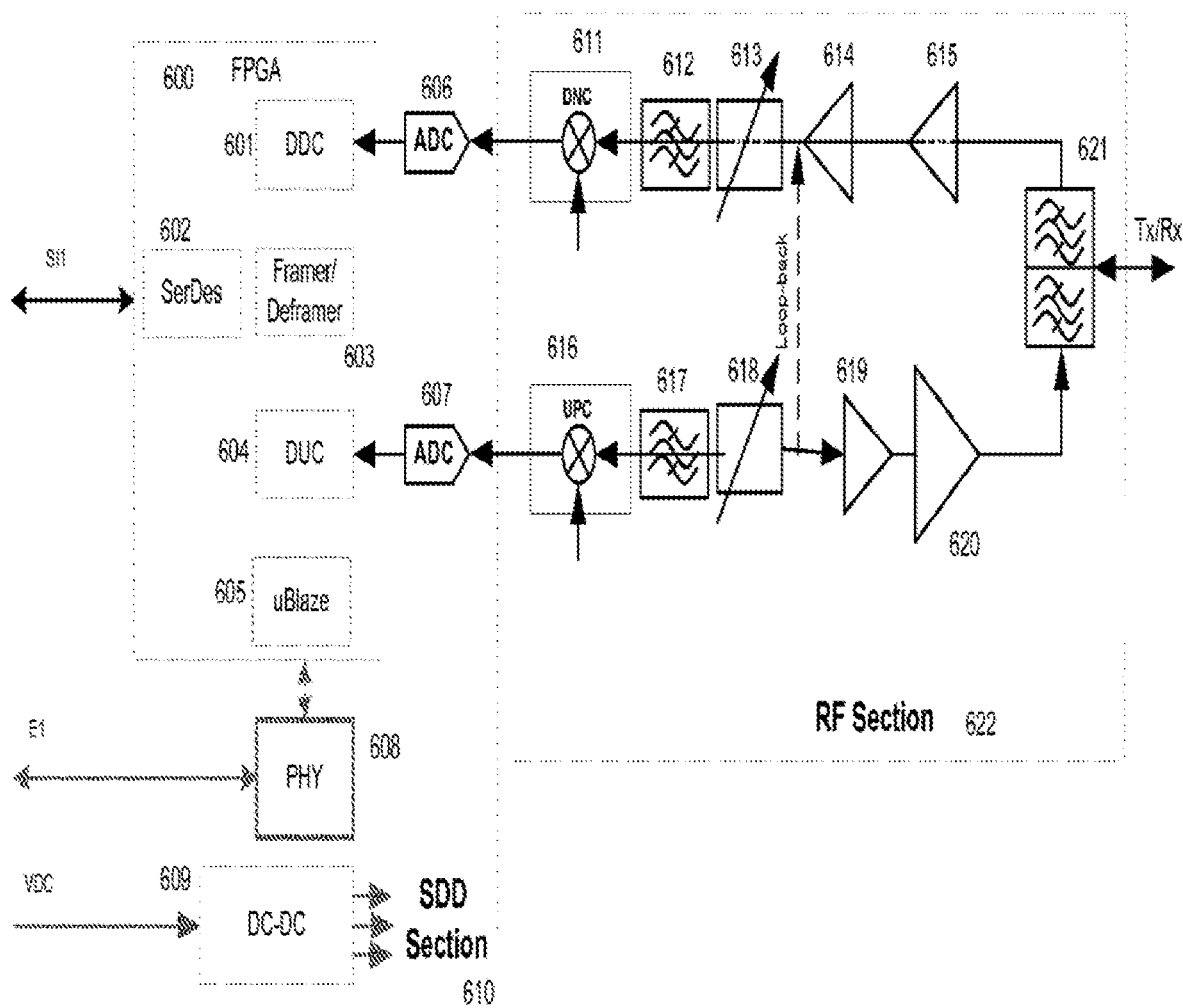
FIG. 6: Remote Radio Head Unit Band Module

NEUTRAL HOST ARCHITECTURE FOR A DISTRIBUTED ANTENNA SYSTEM

RELATED APPLICATIONS

This application is a continuation of U.S. patent application Ser. No. 15/786,396, filed Oct. 17, 2017, now U.S. Pat. No. 10,334,567, which is a continuation of U.S. patent application Ser. No. 14/479,875, filed Sep. 8, 2014, now U.S. Pat. No. 9,826,508; which is a continuation of U.S. patent application Ser. No. 13/211,236, filed Aug. 16, 2011, now U.S. Pat. No. 8,848,766; which claims priority to U.S. Provisional Patent Application No. 61/374,593, filed on Aug. 17, 2010. The disclosures of each are hereby incorporated by reference in their entirety for all purposes.

TECHNICAL FIELD

The present invention generally relates to wireless communication systems employing Distributed Antenna Systems (DAS). More specifically, the present invention relates to a DAS which is part of a distributed wireless network base station in which all radio-related functions that provide network coverage and/or capacity for a given area are contained in a small single unit that can be deployed in a location remote from the remaining distributed wireless network base station unit or units which are not performing radio-related functions. Multi-mode radios capable of operating according to GSM, HSPA, LTE, TD-SCDMA, UMTS and WiMAX standards with advanced software configurability are features in the deployment of more flexible and energy-efficient radio networks. The present invention can also serve multiple operators and multi-frequency bands per operator within a single DAS to reduce the costs associated with radio network equipment and radio network deployment.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. In addition, network operators must consider the most cost-effective evolution of the networks towards 4G and other advanced network capabilities. Wireless and mobile technology standards are evolving towards higher bandwidth requirements for both peak rates and cell throughput growth. The latest standards supporting these higher bandwidth requirements are HSPA+, WiMAX, TD-SCDMA and LTE. The network upgrades required to deploy networks based on these standards must deal with the limited availability of new spectrum, leverage existing spectrum, and ensure operation of all desired wireless technology standards. The processes of scarce resource optimization while ensuring a future-proof implementation must both take place at the same time during the transition phase, which usually spans many years and thus can encompass numerous future developments. Distributed open base station architecture concepts have evolved in parallel with the evolution of the various technology standards to provide a flexible, lower-cost, and more scalable modular environment for managing the radio access evolution. Such advanced base station architectures can generally be appreciated from FIG. 1 [PRIOR ART], which shows an architecture for a prior art Distributed Wireless Network Base Station. In FIG. 1, 100 is a depiction of a Distributed Wireless Network Base Station. The Base Transceiver Station (BTS) or Digital Access Unit (DAU) 101 coordinates the communication between the Remote Radio Head Units 102, 103 and the Base Station Controller (BSC). The BTS communicates with multiple Remote Radio Heads via optical fiber. For example, the Open Base Station Architecture Initiative (OBSAI), the Common Public Radio Interface (CPRI), and the IR Interface standards introduced publicly-defined interfaces separating the Base Transceiver Station (BTS) or Digital Access Unit and the remote radio head unit (RRU) parts of a base station by employing optical fiber transport.

The RRU concept constitutes a fundamental part of an advanced state-of-the-art base station architecture. RRU-based system implementation is driven by the need to achieve consistent reductions in both Capital Expenses (CAPEX) and Operating Expenses (OPEX), and enable a more optimized, energy-efficient, and greener base deployment. An existing application employs an architecture where a 2G/3G/4G base station is connected to RRUs over multiple optical fibers. Either CPRI, OBSAI or IR Interfaces may be used to carry RF data to the RRUs to cover a sectorized radio network coverage area corresponding to a radio cell site. A typical implementation for a three-sector cell employs three RRU's. The RRU incorporates a large number of digital interfacing and processing functions. However, commercially available RRU's are power inefficient, costly and inflexible. Their poor DC-to-RF power conversion insures that they will need to have a large mechanical housing to help dissipate the heat generated. The demands from wireless service providers for future RRU's also includes greater flexibility in the RRU platform, which is not presently available. As standards evolve, there will be a need for multi-band RRUs that can accommodate two or more operators using a single wideband power amplifier. Co-locating multiple operators in one DAS system would reduce the infrastructure costs and centralize the Remote Monitoring Function of multiple Operators on the Network. To accommodate multiple operators and multiple bands per operator would require a very high optical data rate to the RRUs which is not achievable with prior art designs.

BRIEF SUMMARY OF THE INVENTION

The present invention substantially overcomes the limitations of the prior art discussed above. Accordingly, it is an object of the present invention to provide a high performance, cost-effective DAS system, architecture and method for an RRU-based approach which enables each of multiple operators to use multi-frequency bands. The present disclosure enables a RRU to be field reconfigurable, as presented in U.S. Patent application U.S. 61/172,642 (DW¬1016P), filed Apr. 24, 2009, entitled Remotely Reconfigurable Power Amplifier System and Method, U.S. patent application Ser. No. 12/108,502 (DW1011U), filed Apr. 23, 2008, entitled Digital Hybrid Mode Power Amplifier System, U.S. Patent application U.S. 61/288,838 (DW1018P), filed Dec. 21, 2009, entitled Multi-band Wideband Power Amplifier Digital Predistortion System, U.S. Patent application U.S. 61/288,840 (DW1019P), filed Dec. 21, 2009, entitled Remote Radio Head Unit with Wideband Power Amplifier and Method, U.S. Patent application U.S. 61/288,844 (DW1020P), filed Dec. 21, 2009, entitled Modulation Agnostic Digital Hybrid Mode Power Amplifier System, and U.S. Patent application U.S. 61/288,847 (DW1021P), filed Dec. 21, 2009, entitled High Efficiency Remotely Reconfigurable Remote Radio Head Unit System and Method for Wireless Communications incorporated herein by reference. In addition, the system and method of the present invention supports multi-modulation schemes (modulation-independent), multi-carriers, multi-frequency bands, and multi-channels. To achieve the above objects, the present invention maximizes the data rate to the Remote Radio Head Unit in a cost effective architecture. FIGS. 2 and 3 depict a low power RRU and high power RRU. The RRUs depicted in FIGS. 2 and 3 can be extended to a multi-band and multi-channel configuration. Multi-band implies more than two frequency bands and multi-channel implies more than one output to an antenna system. Various embodiments of the invention are disclosed.

An embodiment of the present invention utilizes a RRU Access Module. The objective of the access module is to de-multiplex and multiplex high speed data to achieve aggregate data rates sufficient for operation of a plurality of RRU Band Modules which are geographically distributed. An alternative embodiment of the present invention utilizes the physical separation of the RRU Band Modules from the RRU Access Module using an optical fiber cable, Ethernet cables, RF cable and any other form of connection between the modules. In an alternative embodiment, a Remote Radio Unit comprised of one or more RRU Band Modules may be collocated with the antenna or antennas. In a further alternative embodiment, the RRU Access Module can also supply DC power on the interconnection cabling. In other aspects of the invention, control and measurement algorithms are implemented to permit improved network deployment, network management, and optimization.

Applications of the present invention are suitable to be employed with all wireless base-stations, remote radio heads, distributed base stations, distributed antenna systems, access points, repeaters, distributed repeaters, optical repeaters, digital repeaters, mobile equipment and wireless terminals, portable wireless devices, and other wireless communication systems such as microwave and satellite communications. The present invention is also field upgradable through a link such as an Ethernet connection to a remote computing center.

Appendix I is a glossary of terms used herein, including acronyms.

BRIEF DESCRIPTION OF THE DRAWINGS

Further objects and advantages of the present invention can be more fully understood from the following detailed description taken in conjunction with the accompanying drawings in which:

FIG. 1 [PRIOR ART] is a block diagram showing the basic structure of a prior art Distributed Wireless Base Station system.

FIG. 2 is a block diagram showing a multi-channel High Power Remote Radio Head Unit according to one embodiment of the present invention.

FIG. 3 is a block diagram multi-channel High Power Remote Radio Head Unit according to one embodiment of the present invention.

FIG. 4 is a block diagram of a Remote Radio Head Unit high level system of the present invention.

FIG. 5 is a block diagram of the Remote Radio Head Unit Access Module of the present invention.

FIG. 6 is a Remote Radio Head Unit Band Module according to one embodiment of the present invention.

DETAILED DESCRIPTION OF THE PREFERRED EMBODIMENTS

The present invention is a novel Distributed Antenna System that utilizes a high speed Remote Radio Head Unit Access Module interconnected with Remote Radio Head Unit Band Module.

An embodiment of a Remote Radio Head Unit in accordance with the invention is shown in FIG. 2. Fiber 1, indicated at 200A, is a high speed fiber cable that transports data between the BTS and the Remote Radio Head Unit. Fiber 2, indicated at 200B, is used to daisy chain other remote radio head units which are thereby interconnected to the BTS or DAU. The software-defined digital platform 216 performs baseband signal processing, typically in an FPGA or equivalent. Building block 203 is a Serializer/Deserializer. The deserializer portion extracts the serial input bit stream from the optical fiber 201 and converts it into a parallel bit stream. The serializer portion performs the inverse operation for sending data from the Remote Radio Head Unit to the BTS. In an embodiment, the two distinct bit streams communicate with the BTS using different optical wavelengths over one fiber, although multiple fibers can be used in alternative arrangements. The deframer 204 deciphers the structure of the incoming bit stream and sends the deframed data to the Crest Factor Reduction Algorithm 209. The Crest Factor Reduction block 209 reduces the Peak-to-Average Ratio of the incoming signal so as to improve the Power amplifier DC-to-RF conversion efficiency. The waveform is then presented to the Digital Predistorter block 208. The digital predistorter compensates for the nonlinearities of the Power Amplifier 221 in an adaptive feedback loop. Digital Upconverter 210 filters and digitally translates the deframed signal to an IF frequency. The Framer 204 takes the data from the two digital downconverters 206, 207 and packs it into a Frame for transmission to the BTS over the optical fiber 201. Elements 211 and 212 are Analog to Digital converters that are used to translate the two analog receive signals into digital signals. The receiver comprises a diversity branch which contains a downconverter 217 and a Band Pass Filter 223. The main branch has a receiver path comprised of a duplexer 224 and a downconverter 218. In some embodiments, one or both downconverters 217 and 218 can have an integral uplink low-noise amplifier.

The power amplifier has an output coupler for extracting a replica of the output signal in the feedback path. The feedback signal is frequency-translated by downconverter 219 to either an IF frequency or baseband and presented to an Analog to Digital converter 213. This feedback signal is used in an adaptive loop for performing Digital Predistortion to compensate for any nonlinearities created by the power amplifier.

The Ethernet cable is used to locally communicate with the Remote Radio Head Unit. Switch 226 is used to allow easy access to either the FPGA or the CPU. DC power converters 228 and 229 are used to obtain the desired DC voltages for the Remote Radio Head Unit. Either an external voltage can be connected directly into the RRU or the DC power may be supplied through the Ethernet cable.

Although the description of the instant embodiment is directed to an application where a second optical fiber connection provides a capability for daisy chaining to other Remote Radio Head Units, an alternative embodiment provides multiple optical fiber connections to support a modified "hybrid star" configuration for appropriate applications which dictate this particular optical transport network configuration.

FIG. 3 depicts a remote radio head unit. In at least some designs, this architecture offers benefits when the RF output power is relatively low. In the embodiment shown in FIG. 3, digital predistortion and crest factor reduction are not employed as was the case in FIG. 2. Even though this topology shows a non-diversity configuration, a diversity receive branch can be added along with an additional transmitter path for development of a Multiple Input Multiple Output (MIMO) Remote Radio Head Unit.

The Remote Radio Head Unit high level system is shown in FIG. 4. It comprises a Remote Radio Head Unit Access Module 400 which communicates directly with the BTS or DAU. The function of the Remote Radio Head Unit Access Module 400 is to route the high speed data (at any desired speed, e.g., such as 10 Gbps as illustrated in FIG. 4) (the "Data Speed) to the multiple Remote Radio Head Unit Band Modules and allows for local communications with them via Ethernet. A backplane 401 is used to interconnect the Remote Radio Head Unit Access Module 400 with the various Remote Radio Head Unit Band Modules 402,403, 404,405 at any speed lower than the Data Speed (e.g., less than or equal to 3 Gbps as illustrated in FIG. 4). The output ports of the Remote Radio Head Unit Band Modules are combined and sent to an antenna for transmission. An alternative embodiment is described as follows. Although the description of instant embodiment is directed to applications for up to four Remote Radio Head Unit Band Modules, an alternative embodiment involves feeding a much larger quantity of Remote Radio Head Unit Band Modules with signals of various bandwidths at various frequency bands covering multiple octaves of frequency range, to support a wide range of applications including location-based services, mobile internet, public safety communications, private enterprise telecommunications and broadband, and other wireless applications. The system can in theory support an infinite quantity of RRUs. Also, the Remote Radio Head Unit Band Modules may be set up remotely to have RF power values selected based on the specific desired applications as well as location-specific radio signal propagation factors. A further alternative embodiment leverages the flexibility of the architecture shown in FIG. 4 to provide a capability known as Flexible Simulcast. With Flexible Simulcast, the amount of radio resources (such as RF carriers, CDMA codes or TDMA time slots) assigned to a particular RRU or group of RRUs by each RRU Access Module can be set via software control to meet desired capacity and throughput objectives or wireless subscriber needs.

The detailed topology of the Remote Radio Head Unit Access Module is shown in FIG. 5. It comprises a Small form Factor Pluggable optic transceiver (SFP) 500 which operates on two distinct wavelengths, one for communicating from the BTS to the Remote Radio Head Unit Access Module and the other for communicating in the opposite direction. The SFP contains a Laser Diode for converting the electronic signal to an optical signal and an Optical detector for converting the optical signal into an electronic signal. A multiplexer/demultiplexer 501 converts the high speed data to multiple lower speed data paths for delivery to a FPGA 502. The multiplexer/demultiplexer 501 performs the opposite function when data is being sent back to the BTS or DAU. The framer/deframer 503 routes the data to the appropriate Remote Radio Head Unit Band Modules. An additional multiplexer/demultiplexer 506 allows for further expansion of lower speed Remote Radio Head Units. The number of Remote Radio Head units is only limited by the capability of the FPGA. Local communication with the Remote Radio Head Unit's Access Module's FPGA or the individual Remote Radio Head Unit Band Modules is via an Ethernet connection 508. Although the description of this embodiment is mainly directed to an application where a BTS or DAU (or multiple BTS or DAU) feeds the Remote Radio Head Unit Access Module, an alternative embodiment is described as follows. The alternative embodiment is one where the digital optical signals fed to the Remote Radio Head Unit Access Module may be generated by an RF-to-Digital interface which receives RF signals by means of one or more antennas directed to one or more base stations located at some distance from the Remote Radio Head Unit Access Module. A further alternative embodiment is one where the digital signals fed to the Remote Radio Head Unit Access Module may be generated in a combination of ways; some may be generated by an RF-to-Digital interface and some may be generated by a BTS or DAU. Some neutral host applications gain an advantage with regard to cost-effectiveness from employing this further alternative embodiment. Although the optical signals fed to the Remote Radio Head Unit Access Module described in the preferred and alternative embodiments are digital, the optical signals are not limited to digital, and can be analog or a combination of analog and digital. A further alternative embodiment employs transport on one or multiple optical wavelengths fed to the Remote Radio Head Unit Access Module.

The Remote Radio Head Unit Band Module is shown in FIG. 6. It comprises a Software Defined Digital (SDD) section 610 and an RF section 622. An alternative embodiment employs a Remote Antenna Unit comprising a broadband antenna with RRU Band Module Combiner and multiple plug-in module slots, into which multiple RRU Band Modules intended for operation in different frequency bands are inserted. To provide an overall compact unit with low visual impact, this embodiment employs RRU Band Modules which each have a physically small form factor. One example of a suitably small form factor for the RRU Band Module is the PCMCIA module format. A further alternative embodiment employs RRU Band Modules where each has an integral antenna, and the embodiment does not require a common antenna shared by multiple RRU Band Modules.

In summary, the Neutral Host Distributed Antenna System (NHDAS) of the present invention enables the use of remote radio heads for multi-operator multi-band configurations, which subsequently saves hardware resources and reduces costs. The NHDAS system is also reconfigurable and remotely field-programmable since the algorithms can be adjusted like software in the digital processor at any time.

Moreover, the NHDAS system is flexible with regard to being able to support various modulation schemes such as QPSK, QAM, OFDM, etc. in CDMA, TD-SCDMA, GSM, WCDMA, CDMA2000, LTE and wireless LAN systems. This means that the NHDAS system is capable of supporting multi-modulation schemes, multi-bands and multi-operators.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A remotely reconfigurable remote radio head unit (RRU) for transporting radio frequency signals, the remotely reconfigurable remote radio head unit comprising:
a plurality of band modules,
an access module coupled to the plurality of band modules, comprising:
a transceiver configured to convert a downlink signal to a downlink electronic signal associated with a first data rate;
a multiplexer/demultiplexer coupled to the transceiver and configured to convert the downlink electronic signal associated with the first data rate to a plurality of signals, each signal of the plurality of signals having a second data rate less than the first data rate;
a module coupled to the multiplexer/demultiplexer, wherein the module comprises:
a framer/deframer configured to:
receive the plurality of signals at the second data rate;
frame RRU data from the plurality of signals at the second data rate for an individual RRU band module of the plurality of RRU band modules; and
route the framed RRU data to the individual RRU band module of the plurality of RRU band modules; and
a plurality of RRU outputs coupled to the module and configured to provide the framed RRU data to the plurality of RRU band modules.

2. The RRU of claim 1, wherein the module comprises a field programmable gate array.

3. The RRU of claim 1, wherein the access module has separately reconfigurable parameters associated with each of the plurality of RRU band modules.

4. The RRU of claim 3, wherein the separately reconfigurable parameters comprise at least one of an operator, frequency, or carrier.

5. The RRU of claim 3, further comprising an Ethernet switch for communicating the separately reconfigurable parameters to the plurality of RRU band modules.

6. The RRU of claim 1, wherein the transceiver further comprises a small form factor pluggable optic transceiver configured to operate on at least two distinct wavelengths.

7. The RRU of claim 1, further comprising a software control operable to provide a Flexible Simulcast capability.

8. The RRU of claim 1, wherein the downlink signal is an analog optical signal.

9. The RRU of claim 1, wherein each RRU band module of the plurality of RRU band modules is PCMCIA compatible.

10. The RRU of claim 1, wherein one or more RRU band modules of the plurality of RRU band modules has a diversity receive branch.

11. The RRU of claim 1, wherein the RRU receives power over Ethernet.

12. A remotely reconfigurable remote radio head unit (RRU) comprising:
a plurality of RRU band modules; and
an access module coupled to the plurality of RRU band modules comprising:
an RF-to-Digital interface configured to output a downlink signal associated with a first data rate;
a multiplexer/demultiplexer coupled to the RF-to-Digital interface and configured to convert the downlink signal associated with the first data rate to a plurality of signals, each signal of the plurality of signals having a second data rate less than the first data rate;
a module coupled to the multiplexer/demultiplexer, wherein the module comprises:
a framer/deframer configured to:
receive the plurality of signals at the second data rate;
frame RRU data from the plurality of signals at the second data rate for an individual RRU band module of the plurality of RRU band modules; and
route the framed RRU data to the individual RRU band module of the plurality of RRU band modules; and
a plurality of RRU outputs coupled to the module and configured to provide the framed RRU data to the plurality of RRU band modules.

13. The RRU of claim 12, wherein the access module has separately reconfigurable parameters associated with each of the plurality of RRU band modules.

14. The RRU of claim 13, wherein the separately reconfigurable parameters comprise at least one of an operator, frequency, or carrier.

15. The RRU of claim 13, further comprising an Ethernet switch for communicating the separately reconfigurable parameters to the plurality of RRU band modules.

16. The RRU of claim 12, further comprising a software control operable to provide a Flexible Simulcast capability.

17. The RRU of claim 12, wherein each RRU band module of the plurality of RRU band modules is PCMCIA compatible.

18. The RRU of claim 12, wherein one or more RRU band modules of the plurality of RRU band modules has a diversity receive branch.

19. The RRU of claim 12, wherein the RRU receives power over Ethernet.

* * * * *